Jan. 25, 1966  W. E. LANHAM  3,231,069
CHAIN LINK
Filed Oct. 24, 1961  2 Sheets-Sheet 1
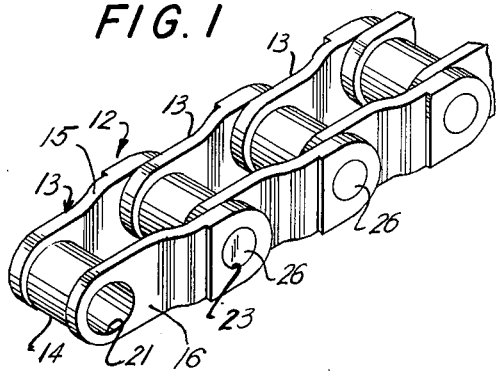
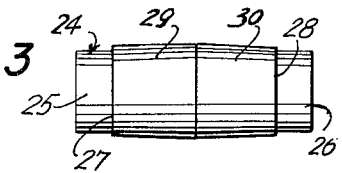
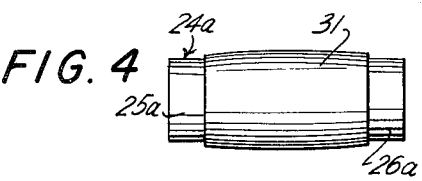
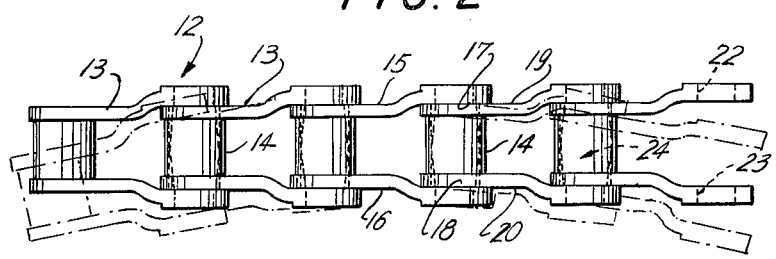
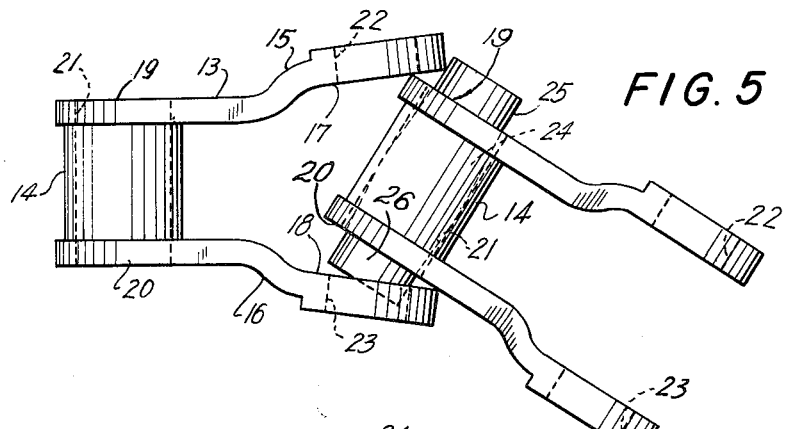
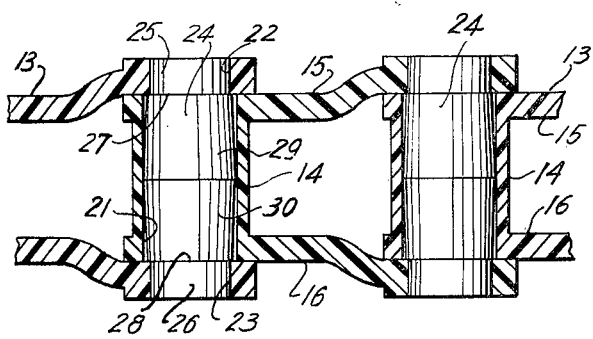
INVENTOR.
WILLIAM E. LANHAM
BY
Curtis, Morris & Safford
ATTORNEYS Jan. 25, 1966  W. E. LANHAM  3,231,069
CHAIN LINK
Filed Oct. 24, 1961  2 Sheets-Sheet 2
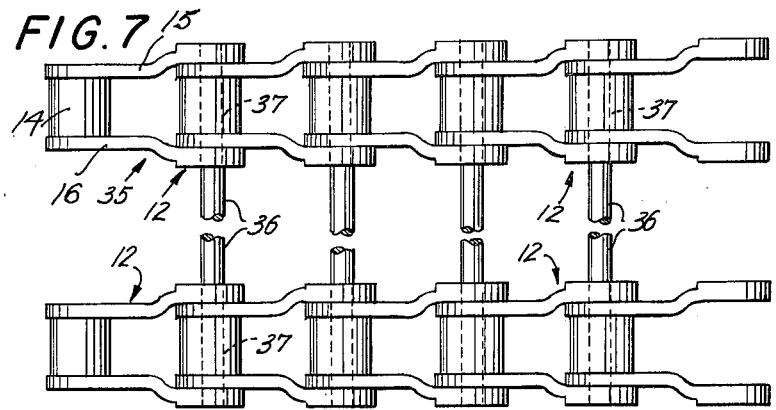
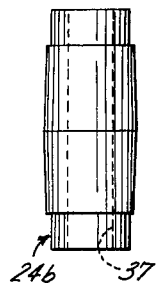
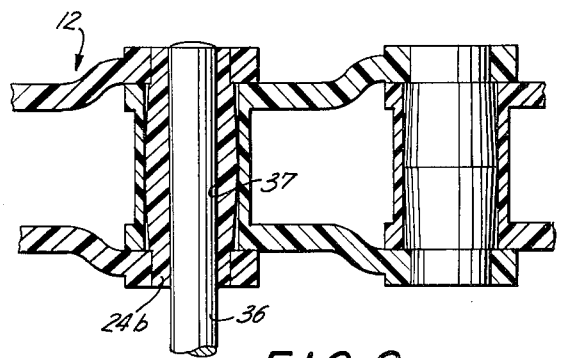
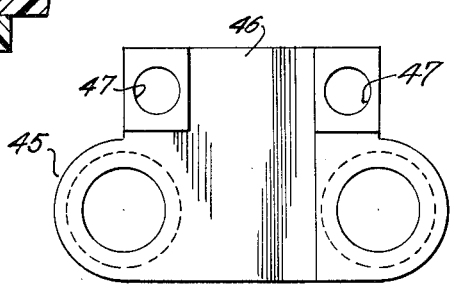
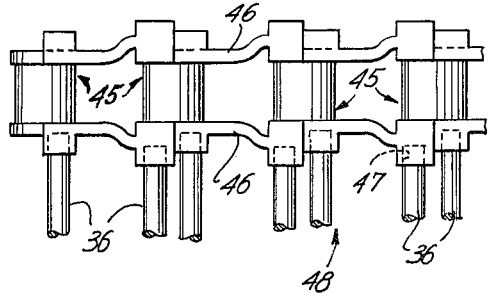
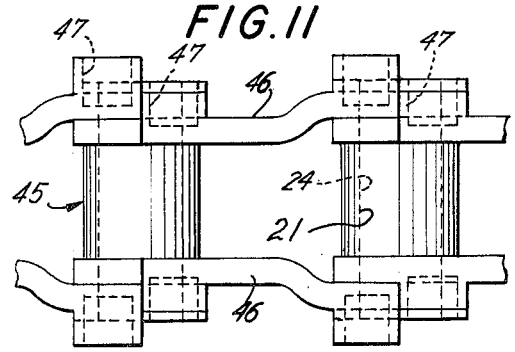
INVENTOR.
WILLIAM E. LANHAM
BY
Curtis, Morris & Safford
ATTORNEYS United States Patent Office 3,231,069
Patented Jan. 25, 1966

3,231,069
CHAIN LINK
William E. Lanham, 3456 Woods St., Decatur, Ga.
Filed Oct. 24, 1961, Ser. No. 147,365
6 Claims. (Cl. 198—189)

The present invention relates to chains having an improved link construction and this application is a continuation-in-part of my prior application Serial No. 109,291, filed May 11, 1961, now Patent No. 3,127,980 and entitled Chain Link.

The chain links of the present invention are adapted for the same uses as the chain links of my prior application, referred to above. For example, the chain links may be used in power transmission and conveyor chains of general application and are particularly adapted for use in conveyors for bakery products. Conveyor belts for bakery products, such as bread, should be constructed to prevent the accumulation of crumbs, prevent contamination of the product being conveyed and provide a uniform drive. An improved resilient link construction for such purposes is described and claimed in my prior application in which each link may be assembled with other links to form a chain by merely snapping one link over the other. Rods are assembled between corresponding links of a pair of continuous chains which then forms a conveyor belt for bakery products, or the like. When the conveyor is to be moved in a curved path in a horizontal plane the links of the spaced conveyor chains may be made of different lengths or have special constructions to adapt the inner chain to move at a slower rate than the outer chain.

One of the objects of the present invention is to provide an improved link construction for a chain which adapts the links to move relative to each other in right angular planes.

Another object is to provide an improved chain construction having adjacent links pivotally connected to each other by pivot pins therebetween and assembled one on the other by snapping the spaced arms of each link over the ends of a pivot pin.

Another object is to provide a pivot pin between adjacent links which is adapted to rock longitudinally as well as rotate relative to at least one of the links which it connects.

Another object is to provide a conveyor belt having a pair of spaced chains of the type indicated with transverse rods extending between corresponding links of the spaced chains.

Still another object is to provide an improved link construction for chains and conveyor belts which is of relatively simple construction, adapted for economical manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a perspective view of several links of a chain incorporating the improved link and pin construction of the present invention;

FIGURE 2 is a plan view of a section of chain showing the manner in which the chain flexes laterally to move in a curved path;

FIGURE 3 is an enlarged side elevational view of a connecting pin to show its conically tapered form;

FIGURE 4 is a view similar to FIGURE 3 showing a pin of modified construction having a rounded contour between its ends;

FIGURE 5 is a plan view showing the manner in which the links are snapped into interlocked engagement for articulation, one on the other;

FIGURE 6 is a sectional plan view of a series of links of a chain showing the shape of the pins to adapt them to rock longitudinally as well as rotate relative to the links which they connect;

FIGURE 7 is a plan view of a conveyor belt of spaced chains and connecting rods incorporating the improved link and pin constructions of the present invention;

FIGURE 8 is a view similar to FIGURE 3 showing a tapered pin of hollow construction to receive the ends of the connecting rods;

FIGURE 9 is a view similar to FIGURE 6 showing a connecting rod extending through a hollow pin;

FIGURE 10 is a side elevational view of a link of modified construction to receive the ends of the connecting rods;

FIGURE 11 is a plan view of the modified form of link illustrated in FIGURE 9; and FIGURE 12 is a view similar to FIGURE 11 on a reduced scale and showing connecting rods mounted in the links.

Referring now to FIGURES 1 to 6 of the drawings, the present invention is shown applied to a chain for general application. It is to be understood, however, that the chain links of the present invention, in addition to providing a chain for general application, are particularly adapted for use in an improved conveyor belt for conveying bakery products, such as bread loaves and the like. Such a conveyor belt is illustrated in FIGURES 7 to 10 of the drawings.

In accordance with the present invention, the improved chain 12 comprises a plurality of resilient links 13 of generally U-shaped form to adapt them to be snapped one over the other into interlocking articulated relationship. Each U-shaped link 13 comprises a sleeve 14 and spaced arms 15 and 16 projecting from one side of the sleeve 14 in a one piece integral structure. As shown in the drawings, each arm 15 and 16 is offset laterally intermediate its end a distance equal to its thickness so that the inside faces 17 and 18 of the outer ends of the arms 15 and 16 are aligned with the outside faces 19 and 20 of the arms adjacent the sleeve 14 of the next adjacent link. The sleeve 14 of each link 13 has an axial bore 21 and the outer ends of the arms 15 and 16 are provided with aligned cylindrical holes 22 and 23. Adjacent links 13 are connected by pins 24 positioned in the bore 21 of sleeve 14 and having ends 25 and 26 projecting beyond the sleeve and through the cylindrical holes 22 and 23 in the arms 15 and 16 of the next adjacent link. Thus, each link 13 is adapted to pivot relative to an adjacent link on the connecting pivot pin 24.

As shown in FIGURES 1 and 5, each pivot pin 24 tapers outwardly from a larger diameter midway between its ends to a smaller diameter adjacent its ends. The tapered portions of pin 24 extend for a distance corresponding to the length of the sleeve 14 and the pin has reduced cylindrical ends 25 and 26 projecting from the tapered portions and of a diameter to closely fit the aligned holes 22 and 23 and form annular shoulders 27 and 28 between the pin and reduced ends. In the form illustrated in FIGURE 3, the pins 24 have reversed conical tapers 29 and 30. In the form of construction illustrated in FIGURE 4, the body of the pin 24a between the reduced ends 25a and 26a has a generally rounded contour 31. Either form of pin 24 or 24a illustrated in detail in FIGURES 3 and 4 is adapted to rock in sleeve 14 of the link 12 in which it is mounted to adapt the chain to be flexed from a straight line to a curved arrangement illustrated in FIGURE 2. Thus, a chain 12 of link 13 made in accordance with the present invention not only permits the links to pivot relative to each other, but also permit the links to rock on the pins 24 or 24a longitudinally thereof in a plane at right angles to the pivotal movement.

The links 13 may be composed of any suitable resilient material which is sufficiently flexible to adapt the ends of the arms 15 and 16 to be snapped over the ends 25 and 26 of a connecting pin 24 and resilient enough to return to its original form to connect the links in a continuous chain. Such materials may comprise rigid plastics, such as nylon, or phenolic resins, and even some of the newer type investment casted spring metals. Preferably, the links are composed of an acetal resin manufactured by Dupont under the trade name "Delrin." This material has a high tensile strength and a low coefficient of friction which eliminates any necessity for lubricants. Because of its low coefficient of friction, it will last from two to four times as long as a metal part, due to wear, has a very limited warpage or discoloration and costs less than one-half as much as, for example, stainless steel parts commercially used in bakery equipment. In addition, the material has a high degree of resilience so that arms 15 and 16 of an adjacent link will spring back to their original shape after being spread sufficiently to snap over the ends 25 and 26 of a pin 24 without any permanent deformation. The plastic links 13 may be injection molded in their final shape to form the hollow sleeve 14, arms 15 and 16 and openings 21, 22 and 23 in a single operation to provide an integral one piece structure.

The connecting pins 24 also may be composed of a similar plastic and injection molded in their finished form. Pins 24 also can be composed of a suitable metal either cast or swaged to final form.

Due to the U-shaped form of the links 13 and the spring material of which they are composed, a plurality of the links may be connected to each other in a continuous chain by merely snapping the ends of the arms 15 and 16 over the ends 25 and 26 of a connecting pin 24 projecting from the sleeve 14 of an adjacent link, as shown in FIGURE 5 of the drawings. By hooking one end 25 of a pin 24 in one link 13 at one edge of the opening 22 in arm 15 of another link and then springing the other arm 16 away from the arm 15, the adjacent links may be snapped one over the other in interlocking relation. When a series of the links 13 are connected to each other in this manner, as shown in FIGURE 2, the inside faces 17 and 18 of the arms 15 and 16 of one link bear against the outside faces 19 and 20 of the arms of an adjacent link with the ends 25 and 26 of a pin 24 projecting through the openings 22 and 23 in the arms of the first link. The arms 15 and 16 of one link 13 then are adapted to rotate freely on the ends 25 and 26 of pin 24 and the pin of each link is adapted to rotate freely in the sleeve 14.

As an alternative, the links 13 can be formed from metal with the arms or side plates 15 and 16 initially cast or otherwise formed to adapt them to overlie the ends of a pin 24 and the arms of the link compressed toward the shoulders 27 and 28 on the pin.

The resulting chain may be used for power transmission, conveying articles or for any other purpose. For example, a pair of spaced chains can be arranged in spaced relation and driven by sprockets on a main shaft for conveying articles placed directly thereon. The improved chain link construction of the present invention, however, is particularly adapted for use in a conveyor belt 35, as illustrated in FIGURE 7, for conveying bakery products. The conveyor belt 35 illustrated in FIGURE 7 comprises a pair of spaced chains 12 of the type illustrated in FIGURE 1 having rods 36 extending between corresponding links 13 of the spaced chains. The pins 24b, shown in detail in FIGURE 8, are generally similar to the pins 24 illustrated in FIGURE 3 except that they have an axial bore 37 to receive the ends of rods 36. The bores 37 may be made of a size to provide a press fit with the ends of the rods 36, or the rods may have other forms of construction to attach them to the pins. For example, the ends of the rods 36 may extend through the pins 24b and be spun or staked to provide a shoulder on the rod, the rods may be riveted to the pins, or the ends of the rods may be serrated or knurled to make a closer fit with the plastic pin. In the form of construction illustrated in FIGURE 8, the surface of the pin 24b has a reversed conical surface the same as pin 24 in FIGURE 3, or may have a rounded surface, as shown in FIGURE 4, to adapt the pins to rock longitudinally in the sleeve 14 in the link 13 in which it is mounted. In each of the constructions, the pins 24b have an axial bore 37 to receive the ends of rods 36.

In a still further modified construction, as illustrated in FIGURES 10 to 12, the conveyor belt may be composed of links 45, generally similar to the links 13 illustrated in FIGURE 1 and connected by solid pins 24, but having upwardly projecting sides 46. The upwardly projecting sides 46 have spaced cylindrical recesses 47 at one side for receiving the ends of transverse rods 36 to form the conveyor belt 48. As each rod 36 moves with the link 45 to which it is attached, the ends of the rods 36 may have a pressed fit in the cylindrical recesses 47 to mount the rods thereon. In the form of construction illustrated in FIGURES 10 to 12, a plurality of links 45 are assembled in the manner previously described to form a plurality of chains. The spaced chains are then connected to each other by means of the rods 36 which are projected into the recesses 47 in the links to complete the resulting conveyor belt 48. The adjacent links are adapted to pivot relative to each other and to flex longitudinally of the connecting pins and thus provide a chain which will pivot in two planes thereby making the chain of a multi-plane type.

It will now be observed that the present invention provides an improved multi-plane chain of an improved link construction which adapts the links to move with respect to each other in right angular planes. It will also be observed that the present invention provides an improved chain construction having adjacent links pivotally connected to each other by pivot pins therebetween and adapted to be assembled one on the other by merely snapping each link over the ends of a pivot pin. It will further be observed that the present invention provides a pivot pin between adjacent links in a chain which are adapted to rock longitudinally as well as rotate relative to the link in which it is mounted. It will still further be observed that the present invention provides a chain of the type indicated having links for receiving transverse rods to form a conveyor belt for bakery products and the like.

While several forms of construction are herein illustrated and described, it will be understood that further changes may be made in the construction and arrangement of elements without departing from the spirit or scope of the invention. Therefore, without limitation in this respect, the invention is defined by the following claims.

I claim:

1. A chain of connected links in which each link consists of a unitary one-piece integral construction of a resilient material having a hollow sleeve forming a cylindrical opening therein and spaced arms projecting from one side of the sleeve adjacent the ends thereof, said arms having aligned openings smaller than the opening in the sleeve and adapted to overlie the opposite ends of the sleeve of an adjacent link, a pin in the sleeve of each link having reduced ends forming annular shoulders, said reduced ends of the pin projecting beyond the sides of link into the aligned openings of smaller diameter in the arms of said adjacent link, and said links being assembled by spreading the arms of each link to snap them over the ends of the pin in the next adjacent link whereby the pin is locked in position between the links it connects by the engagement of the resilient arms of one link with the annular shoulders on the pin in the sleeve of the next adjacent link.

2. A chain in accordance with claim 1 in which the pin for each link has a larger diameter in a plane normal to its axis midway between its ends than at any other place throughout its length for line contact with the sleeve of the link in which it is located to adapt the pin to rock in its sleeve longitudinally thereof.

3. A chain in accordance with claim 2 in which the pins have a conical taper from midway between its ends outwardly, and the ends of reduced diameter provide the annular shoulder adjacent the reduced ends.

4. A chain in accordance with claim 2 in which the surface of the pin has a rounded contour from midway between its ends outwardly.

5. A chain in accordance with claim 1 in which the pin has an axial opening to receive a cylindrical insert therein.

6. A conveyor belt comprising a pair of spaced chains of connected links, each link of each chain consisting of a unitary one-piece integral construction of a resilient material having a hollow sleeve forming a cylindrical opening therein and spaced arms projecting from one side of the sleeve adjacent the ends thereof, said arms having aligned openings smaller than the opening in the sleeve and adapted to overlie the opposite ends of the sleeve of an adjacent link, a pin in the sleeve of each link having reduced ends forming annular shoulders, said reduced ends of the pin projecting beyond the sides of link into the aligned openings of smaller diameter in the arms of said adjacent link, and said links being assembled by spreading the arms of each link to snap them over the ends of the pin in the next adjacent link whereby the pin is locked in position between the links it connects by the engagement of the resilient arms of one link with the annular shoulders on the pin in the sleeve of the next adjacent link and rods extending between corresponding links of the spaced chains.

References Cited by the Examiner
UNITED STATES PATENTS

| | | | |
|---|---|---|---|
| 670,285 | 3/1901 | Levalley | 198—189 X |
| 2,090,395 | 8/1937 | Cartlidge | 198—189 X |
| 2,114,146 | 4/1938 | Klein et al. | 198—189 X |
| 2,118,736 | 5/1938 | Odom | 198—195 |
| 2,272,421 | 2/1942 | Miller | 198—195 X |
| 2,553,646 | 5/1951 | Field | 198—189 X |
| 2,687,651 | 8/1954 | Webb | 74—251 X |

FOREIGN PATENTS

| | | |
|---|---|---|
| 210,323 | 5/1909 | Germany. |
| 596,287 | 3/1931 | Germany. |

SAMUEL F. COLEMAN, *Primary Examiner.*

JULIUS E. WEST, *Examiner.*